United States Patent
Lucibello et al.

(10) Patent No.: US 12,334,107 B1
(45) Date of Patent: Jun. 17, 2025

(54) PROCESS FOR THE PREPARATION OF A PHONOGRAPH DISC

(71) Applicant: Università degli Studi di Roma "La Sapienza" "LA SAPIENZA", Rome (IT)

(72) Inventors: Sabrina Lucibello, Rome (IT); Giovanni Inglese, Rome (IT)

(73) Assignee: Università degli Studi di Roma "La Sapienza", Rome (IT)

( * ) Notice: Subject to any disclaimer, the term of this patent is extended or adjusted under 35 U.S.C. 154(b) by 0 days.

(21) Appl. No.: 18/842,934

(22) PCT Filed: May 11, 2023

(86) PCT No.: PCT/IB2023/054865
§ 371 (c)(1),
(2) Date: Aug. 30, 2024

(87) PCT Pub. No.: WO2023/223151
PCT Pub. Date: Nov. 23, 2023

(30) Foreign Application Priority Data

May 18, 2022 (IT) .......................... 102022000010328

(51) Int. Cl.
*G11B 11/16* (2006.01)
*G11B 3/70* (2006.01)

(52) U.S. Cl.
CPC ............... *G11B 11/16* (2013.01); *G11B 3/70* (2013.01)

(58) Field of Classification Search
CPC .................................. G11B 11/16; G11B 3/70
See application file for complete search history.

(56) References Cited

U.S. PATENT DOCUMENTS

| | | | |
|---|---|---|---|
| 1,158,660 A | 11/1915 | Edison | |
| 2,068,919 A | 1/1937 | Kogel | |
| 6,353,219 B1 * | 3/2002 | Kley | ................ G11B 9/1436 |
| 2002/0068198 A1 * | 6/2002 | Kerfeld | ................ G11B 5/65 |
| 2005/0195631 A1 * | 9/2005 | Schindler | ................ G11B 11/16 |

FOREIGN PATENT DOCUMENTS

GB 358 928 A 10/1931

OTHER PUBLICATIONS

International Search Report and Written Opinion dated Aug. 10, 2023, for PCT Application No. PCT/IB2023/054865.
Alonso, Bogar. Many Shades of Play: Records Made From More Than Just Vinyl. Retrieved from the Internet: URL:https://www.vice.com/en/article/nzd89z/many-shades-of-play-records.made-from-more-than-just-vinyl. May 15, 2013.

* cited by examiner

*Primary Examiner* — Andrew Sasinowski
(74) *Attorney, Agent, or Firm* — Daniel A. Blasiole; DeWitt LLP

(57) ABSTRACT

The present invention relates to a new process for the production of a phonograph disc for analog storing, recording and/or reproduction of a sound content, as well as to a phonograph disc obtainable by means of the aforementioned process.

19 Claims, 3 Drawing Sheets

PROCESS FOR THE PREPARATION OF A PHONOGRAPH DISC

The present invention provides a new process for the production of a phonograph disc for analog storage, recording and/or reproduction of a sound content, as well as a phonograph disc obtainable by means of the aforementioned process.

STATE OF THE ART

The renewed success of the vinyl industry, which started in the second decade of the 2000s, has not been accompanied by a virtuous process of innovation in the sector: to date, the production processes used for the production of vinyl records are almost obsolete and require the use of polluting materials, with a significant environmental and energy impact.

Polyvinyl chloride (PVC) is by far the most used material for the production of granules for printing phonograph records; however, the extraction and processing of this material involves a considerable expenditure of energy. Although, with a view to greater environmental sustainability, many companies have adopted molding procedures that involve mixing "virgin" granules with recycled PVC, the quantities of renewable raw materials used in the sector remain very limited due to the reduced sound quality often caused by impurities present in these materials.

Despite the various improvements made in the sector, such as the use of recycled PVC in addition to the "virgin" one as well as the use of renewable sources to power the production machinery, the use of non-renewable plastic raw materials derived from petroleum still affects much of the vinyl industry today. In recent years, the growing difficulty in procuring plastic raw materials and the increase in the cost of energy, largely linked to the post-Covid-19 crisis, have caused an increase in prices (i.e. between 30% and 50%) and waiting times in the sector, with an increase in production times even from 10-12 up to 24 weeks.

In this context, the need to develop alternative processes for the production of phonograph records therefore appears to be strongly felt, with the aim of guaranteeing greater environmental sustainability and at the same time providing contained costs and production times.

SUMMARY OF THE INVENTION

The authors of the present invention, in order to solve the problems related to the use of plastics in the technical sector indicated above, have developed an original and innovative process for the preparation of phonograph discs for storage, recording and/or reproduction of a sound content which makes it possible to obtain eco-compatible phonograph discs which can be reproduced using conventional devices for reproducing vinyl records and also using the "negative" matrixes currently used in the vinyl record industry. The process of the invention, therefore, is particularly advantageous as it allows to exploit part of the existing technology (thus without causing further negative impacts for the environment) and provides phonograph discs which do not cause a negative environmental impact and do not require the use of plastics or other materials that are negative for the environment and for the ecosystem. Even the production process itself, in addition to the materials used for it, has a minimal and in any case greatly reduced impact of energy consumption (and therefore environmental pollution) compared to the current vinyl industry.

In particular, the process developed by the authors of the invention makes it possible to eliminate the use of petroleum-derived plastic materials and to draw from renewable sources, in particular biomass, for the production of phonograph discs with high sound performance.

In fact, the authors of the present invention have found that the replacement of non-renewable raw materials, traditionally used in the field of phonograph disc production, with aqueous compositions comprising a gelling agent of natural origin, allows to make phonograph supports for recording or reproduction of sound with high quality standards and a significant gain in terms of time, costs, and sustainability.

The process object of the present invention provides for the use of an aqueous composition comprising a gelling agent derived from seaweed, sodium alginate, preferably in an amount equal to 2.5% by weight: the use of this material, relating to the bioplastics sector, is particularly advantageous since it does not compete with the food sector and allows to save water and achieve greater productivity. The production of "bioplastics" from biomass also leads to a reduction in carbon dioxide, an important advantage from an environmental and energy point of view.

Unlike the printing processes commonly used for the production of vinyl records, generally comprising the hot stamping of the records by means of a hydraulic press, embodiments of the process developed by the authors of the present invention provide for the simple cold pouring of an aqueous composition comprising a gelling agent of natural origin on top of a common molding matrix used for the production of phonograph records, for example a metal "stamper": the layer formed by pouring the composition onto the surface of the molding matrix is allowed to solidify and is finally simply removed from the matrix, resulting in cost and energy savings.

The phonograph discs in bioplastic material obtainable by means of the process of the invention contain the characteristic "grooves" of the sound recording and do not require particular further finishing processes. According to one aspect of the invention the discs can be made by producing a phonograph film having the same characteristics necessary for the reproduction of soundtracks (groove resulting from printing on a negative) subsequently combined with a suitable support element. This support can form the soul of the resulting phonograph disc and, at the same time, act as a label, offering further savings in terms of costs and materials.

As mentioned above, advantageously, the process object of the present invention is compatible with the ancillary traditional methods ("suitable master" or "stamper" and technologies for sound reproduction) related to the production and use of vinyl records as well as with the more innovative technologies adopted in recent years in the sector, for example the Vinyl HD technology, which provides for the production of "stampers" by laser engraving of ceramic plates, with a greater reduction in energy and pollution compared to traditional methods.

By virtue of the possibility of overcoming the difficulty of finding plastic material, its high costs and its negative environmental impact, the process object of the present invention finds application in the industrial sector of the production of vinyl records, and in particular in the field of production of small runs, the niche ones, usually characterized by very long waiting times.

In general, the record manufacturing industries tend to give priority to the numerous pressings of the big labels, often making it impossible for the small labels, which provide an important cultural contribution, to make releases on vinyl records. The following are therefore the object of the present invention:

A process for the production of a phonograph film for analog storage, recording and/or reproduction of a sound content, comprising at least the following steps:
cold pouring, on the surface of a molding disc bearing at least one relief configured to negatively encode said sound content distributed in a spiral-like direction, starting from the perimeter edge towards the center of said surface, of an aqueous composition comprising a gelling agent of natural origin, so as to form a homogeneous film of said composition on said surface of the molding disc having a flat face and a printed opposite face, and allowing said film to solidify;
said relief being configured to form, following said solidification, a corresponding groove encoding said sound content on the printed face of said film in contact with said surface of the molding disc;
separation of said film from the molding disc in such a way as to obtain said phonograph film.

A process for the production of a phonograph disc for analog storage, recording and/or reproduction of a sound content, comprising at least the following steps:
cold pouring, on the surface of a molding disc bearing at least one relief configured to negatively encode said sound content distributed in a spiral-like direction, starting from the perimeter edge towards the center of said surface, of an aqueous composition comprising a gelling agent of natural origin, so as to form a homogeneous layer of said composition on said surface of the molding disc having a flat face and a printed opposite face, and allowing said layer to solidify;
said relief being configured to form, following said solidification, a corresponding groove encoding said sound content on the printed face of said layer in contact with said surface of the molding disc;
separation of said layer from the molding disc in such a way as to obtain said phonograph disc.

a phonograph film obtainable by a process according to any one of the embodiments herein disclosed;

a process for the preparation of a phonograph disc for analog storage, recording and/or reproduction of a sound content comprising the following steps
providing a phonograph film according to any one of the embodiments herein disclosed;
cold pouring, on the flat face of said phonograph film, an aqueous composition as defined in the present description and in the claims and allowing said aqueous composition to solidify so as to form a flat and homogeneous layer integral with said film;

a process for the preparation of a phonograph disc for analog storage, recording and/or reproduction of a sound content comprising the following steps
providing a phonograph film according to any one of the embodiments herein disclosed;
providing a flat support element having a discoidal shape having a first face (A) and a second face (B); and
fixing the flat face of said phonograph film to said first face (A); and a phonograph disc obtainable by a process according to any one of claims herein disclosed.

Other advantages, characteristics and methods of use of the present invention will become evident from the following detailed description of some embodiments, presented by way of non-limiting example.

DETAILED DESCRIPTION OF THE FIGURES

FIG. 1 shows a schematic representation of a process according to an embodiment of the present invention.

FIGS. 2A-C are photographic representations of some steps of the process according to the embodiment schematized in FIG. 1.

GLOSSARY

Figure 1:
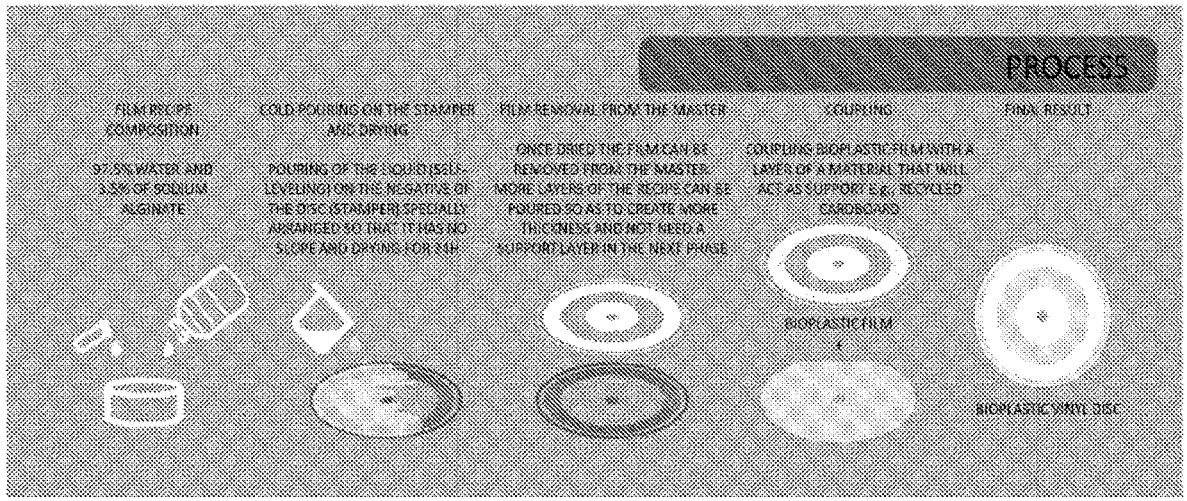

The terms used in the present description are as generally understood by the person skilled in the art, unless otherwise indicated.

The expression "negatively encoding" or "negative" is used in the context of the present invention to indicate that the at least one relief present on the surface of a molding disc according to any of the variants described in the present application represents the exact opposite, "the negative print" or "negative cast" of the groove encoding a certain sound content or signal that will be formed on at least one side of a phonograph film or phonograph disc according to any of the embodiments described herein.

The term "film" is used in the context of the present invention to indicate a film obtainable by a process according to any of the embodiments described herein having, following solidification, a thickness equal to or less than 80 µm. In a preferred embodiment, said film has a thickness of between 25 µm and 80 µm, even more preferably between 40 µm and 80 µm or between 50 and 80 µm, for example equal to 25 µm, 30 µm, 35 µm, 40 µm, 45 µm, 50 µm, 55 µm, 60 µm, 65 µm, 70 µm, 75 µm, or 80 µm.

The term "layer" is used in the context of the present invention to indicate a layer obtainable by a process according to any of the embodiments described herein having, following solidification, a thickness greater than 80 µm, preferably having a thickness equal to or greater than 100 µm, 500 µm or 1 mm, even more preferably having a thickness between 1 mm and 4 mm, or between 1.9 mm and 3.8 mm, or between about 1 mm and 1.5 mm.

The thicknesses of a film, layer or disc according to any of the variants described herein can be determined using any of the techniques or instruments known to a person skilled in the art, for example by means of a digital caliper.

The term "phonograph disc", used in the context of the present invention, refers to a disc-shaped analogue audio storage, recording and/or reproduction medium obtainable by a process according to any of the embodiments described herein, having a thickness such to give the disc itself that rigidity and/or mechanical resistance necessary to allow its reproduction on any sound reproduction system known in the sector, in particular a record player. According to the present invention, a phonograph disc as defined herein bears on a single face or on each of its faces at least one groove distributed in a spiral manner, starting from the perimetric edge towards the center of the face(s), in which groove is encoded recording of a content, information or sound signal. At any point in this description, the term "phonograph disc" may be replaced by the term "sound record", "microgroove disc" or "microgroove disc".

Analog audio storage or recording generally began with mechanical systems such as the phonautograph and phonograph. Analog storage or recording methods store analog signals directly into or onto a disc-shaped phonograph medium; in particular the signal is stored as a physical texture on a phonograph disc. This is in contrast to digital recording where an analog signal is sampled and quantized to produce a digital signal which is represented and stored as discrete numbers.

The term "flat face" means, in the context of the invention, a uniform surface in the horizontal direction and without grooves or unevenness.

With the term "printed face" is meant, in the context of the invention, a surface bearing said groove encoding a sound content or signal.

The term "self-leveling", used in the context of the present invention, refers to the ability of an aqueous composition according to any of the embodiments described in the present application to spread or distribute itself over a horizontal surface, producing a flat surface, free from irregularities.

The expression "cold", used in the context of the present invention, includes temperatures typical of domestic environments, in particular temperatures in the range from 12 to 26° C., preferably from 15 to 22° C., even more preferably 16° C.

At any point in the description and in the claims the term comprising may be replaced by the term "consisting of".

DETAILED DESCRIPTION

According to a first aspect, the present invention provides a process for the production of a phonograph film for analog storage, recording and/or reproduction of a sound content, comprising at least the following steps:

cold pouring, on the surface of a molding disc bearing at least one relief configured to negatively encode said sound content distributed in a spiral-like direction, starting from the perimeter edge towards the center of said surface, of an aqueous composition comprising a gelling agent of natural origin, so as to form a homogeneous film of said composition on said surface of the molding disc having a flat face and a printed opposite face, and allowing said film to solidify;

said relief being configured to form, following said solidification, a corresponding groove encoding said sound content on the printed face of said film in contact with said surface of the molding disc;

separation of said film from the molding disc in such a way as to obtain said phonograph film.

Said film can then be provided with a support as described below, to produce a phonograph disc, and therefore a product having the characteristics of rigidity and/or mechanical resistance necessary to allow its reproduction on any sound reproduction system easily used in the sector, commonly referred to as "record player".

In a particularly preferred embodiment, the present invention provides a process for the production of a phonograph film for analog storage, recording and/or reproduction of a sound content, comprising at least the following steps:

cold pouring, on the surface of a molding disc bearing at least one relief configured to negatively encode said sound content distributed in a spiral-like direction, starting from the perimeter edge towards the center of said surface, of an aqueous composition comprising a gelling agent of natural origin, so as to form a homogeneous film of said composition on said surface of the molding disc having a flat face and a printed opposite face, and allowing said film to solidify;

said relief being configured to form, following said solidification, a corresponding groove encoding said sound content on the printed face of said film in contact with said surface of the molding disc; wherein said pouring step is carried out one or more times until obtaining, following said solidification, a thickness of said film equal to or less than 80 µm, preferably between 25 and 80 µm, even more preferably between 40 and 80 µm or between 50 and 80 µm;

separation of said film from the molding disc in such a way as to obtain said phonograph film.

For the purpose of preparing a phonograph film having a thickness suitable for easy removal thereof from the molding disc once solidified, it is preferable that in the pouring step according to any of the embodiments described herein, the aqueous composition employed is cold poured or casted onto the surface of the molding disc in an amount sufficient to form a homogeneous film having a thickness of between 2 and 5 mm.

According to one aspect of the invention, several pouring steps of the aqueous composition can be carried out on the flat face of the film formed on the surface of the molding disc, until a final film is obtained, resulting from said several pouring steps, having the thickness suitable for allowing easy removal of the film from the molding disc following solidification.

In particular, it is preferable that the pouring step is carried out at least twice so as to reach a thickness suitable for allowing easy removal of the film from the molding disc following solidification.

In a preferred aspect of the invention, the process for the preparation of a phonograph film according to any of the variants described herein, further comprises the following step, preceding the step of separation of the film from the molding disc:

carrying out one or more times, on the flat face of the film formed on the surface of the molding disc, said cold pouring of the aqueous composition according to any of the variants described herein, until obtaining, following solidification, a thickness of said film less than or equal to 80 µm, preferably between 40 µm and 80 µm or between 50 and 80 µm.

In other words, the pouring of the aqueous composition can be repeated one or more times on the flat face of the first film already previously formed on the surface of the molding disc, until obtaining, following solidification, a thickness of the final film, resulting from said one or more pouring steps, less than or equal to 80 µm, preferably between 40 µm and 80 µm or between 50 and 80 µm.

According to a preferred aspect of the invention, a phonograph film obtainable by a method according to any of the embodiments described herein has, following solidification, a thickness equal to or less than 80 µm.

In a preferred embodiment, said phonograph film has a thickness between 25 µm and 80 µm, even more preferably between 40 µm and 80 µm or between 50 and 80 µm, for example a thickness equal to 25 µm, 30 µm, 35 µm, 40 µm, 45 µm, 50 µm, 55 µm, 60 µm, 65 µm, 70 µm, 75 µm, or 80 µm.

It is object of the present invention also a process for the production of a phonograph disc for analog storage, recording and/or reproduction of a sound content, comprising at least the following steps:

cold pouring, on the surface of a molding disc bearing at least one relief configured to negatively encode said sound content distributed in a spiral-like direction, starting from the perimeter edge towards the center of said surface, of an aqueous composition comprising a gelling agent of natural origin, so as to form a homogeneous layer of said composition on said surface of the molding disc having a flat face and a printed opposite face, and allowing said layer to solidify;

said relief being configured to form, following said solidification, a corresponding groove encoding said sound content on the printed face of said layer in contact with said surface of the molding disc;

separation of said layer from the molding disc in such a way as to obtain said phonograph disc.

According to said aspect, the product deriving from this process is a phonograph disc having already the necessary characteristics of rigidity and/or mechanical resistance necessary to allow its reproduction on any system for sound reproduction commonly used in the sector, commonly referred to as a "record player", without the need to use a further support as described for the film according to the invention.

In a particularly preferred embodiment, the present invention provides a process for the production of a phonograph disc for analog storage, recording and/or reproduction of a sound content, comprising at least the following steps:

cold pouring, on the surface of a molding disc bearing at least one relief configured to negatively encode said sound content distributed in a spiral-like direction, starting from the perimeter edge towards the center of said surface, of an aqueous composition comprising a gelling agent of natural origin, so as to form a homogeneous layer of said composition on said surface of the molding disc having a flat face and a printed opposite face, and allowing said layer to solidify;

said relief being configured to form, following said solidification, a corresponding groove encoding said sound content on the printed face of said layer in contact with said surface of the molding disc; wherein said pouring step is carried out one or more times until obtaining, following said solidification, a thickness of said layer greater than 80 µm, preferably equal to or greater than 100 µm, 500 µm or 1 mm, even more preferably between 1 mm and 4 mm;

separation of said layer from the molding disc in such a way as to obtain said phonograph disc.

For the purpose of preparing a phonograph disc having the mechanical resistance and/or rigidity suitable for its reproduction on a common sound reproduction system, in the pouring step according to any of the embodiments described herein, the aqueous composition used is col poured or casted onto the surface of the molding disc in an amount sufficient to form a homogeneous layer having a liquid thickness of 2 to 5 mm or more.

According to one aspect of the invention, several pouring steps of the aqueous composition can be carried out on the surface of the layer thus obtained, until a final layer is obtained, resulting from said several pouring steps, which is more resistant.

In a preferred aspect of the invention, the process for the preparation of a phonograph disc according to any of the variants described herein, further comprises the following step, preceding the step of separation of the layer from the molding disc:

carrying out one or more times, on the flat face of the layer formed on the surface of the molding disc, said cold pouring of the aqueous composition according to any of the variants described herein, until obtaining, following solidification, a thickness of said layer greater than 80 µm, preferably equal to or greater than 100 µm, 500 µm or 1 mm.

In other words, the step of pouring the aqueous composition onto the flat face of the first layer already previously formed on the surface of the molding disc can be repeated one or more times until obtaining, following solidification, a thickness of the final layer, resulting from said one or more pouring steps, greater than 80 µm, preferably equal to or greater than 100 µm, 500 µm, or 1 mm.

According to a preferred aspect of the invention, a phonograph disc obtainable by a method according to any of the embodiments described herein has, following solidification, a thickness ranging from 1 mm to 4 mm, preferably a thickness ranging from about 1.9 mm and 3.8 mm, or between approximately 1 mm and 1.5 mm.

A molding disc suitable for being used for the production of a phonograph film and/or a disc according to the present invention is any disc-shaped support comprising on the surface at least one relief distributed in a spiral-like direction, starting from peripheral edge towards the center of said surface, configured to encode in negative a sound content or signal both for the production of discs having, for example, the conventional dimensions of commercial vinyl discs. An example of such dimensions includes discs having a diameter of 17.7 cm, 25.4 cm, 30.5 cm, 40.6 cm (corresponding, respectively, to a diameter of 7 inches or 7", 10 inches or 10", 12 inches or 12", and 16 inches or 16"). Preferably, the molding disc is any disc suitable for producing 78 or 33 rpm discs having a diameter of 40.6 cm, 30.5 cm or 25.4 cm (16, 12 or 10 inches, respectively) or 45 rpm discs with a diameter of 17.7 cm (7 inches).

A suitable molding disc bears on the surface at least one relief characterized by surface asperities and/or irregularities which represents the exact inverse of a groove or channel which will be formed on a corresponding face of the resulting phonograph film or disc, inside which groove or channel the content or sound signal to be memorized, recorded and/or reproduced will be encoded.

A molding disc suitable for use in the production of a phonograph film and/or a disc according to the present invention particularly comprises any disc-shaped die known in the art which is configured for printing a disc for analog reproduction of sound content.

According to one aspect of the invention, the molding disc is a common mold or negative matrix used in the sector for the production of traditional vinyl records, in particular it is a "master" disc or a "stamping disc" also known in the sector as a "stamper". The surface of a "master" or "stamper" record is characterized by the presence of one or more bumps or ridges that incorporate the "negative" of the information, content or sound signal to be transferred or imprinted on the phonograph disc.

A molding disc suitable for use in a process according to the present invention, for example a "master" disc or a "stamper" disc, can be obtained according to any of the techniques known to an expert in the sector. Merely by way of example, a "master" type pressing disc can be obtained through a process which provides, as a first step, the creation of a metal "lacquer" inside which the desired content or sound signal is encoded. A "lacquer", also known in the industry as an "acetate" or "transcription disc", is commonly made of an aluminum disc coated with a layer of nitrocellulose: by means of an engraver lathe, a certain content, signal, or sound recording correctly equalized and optimized for a phonograph disc, it can be transferred to the surface of the lacquer through the physical movement of a pin (e.g. a helium-cooled sapphire pin), which affects the lacquer with one or more characteristic spiral grooves encoding the contents, signal or sound recording. Once engraved, a lacquer can undergo a plating process: for this purpose, the lacquer is initially cleaned with liquid in order to remove dust or oil present on the surface and is subsequently covered with a thin coating of silver chloride. At this point, through a galvanic process, a nickel plate is made on the upper face of the lacquer.

Once the optimal thickness has been reached, the nickel plate can be removed from the lacquer: thus the previously mentioned "master" disc is obtained, i.e. a cast negative characterized by a surface spiral-like relief or ridge, exactly corresponding to the original furrow or groove engraved on the lacquer.

A molding disc of the "stamper" type suitable for use in a process according to the present invention can be obtained starting from a disc of the "master" type. According to an exemplifying procedure, starting from the "master" disc it is possible to create a new nickel plate or disc: this plate or disc takes the name of mother disc or, in English, "mother", and represents a positive cast of the original lacquer i.e. comprising a surface groove or groove exactly corresponding to the original groove or groove engraved on the lacquer. The "mother" plate can be subjected to a further galvanic process in order to obtain the formation of a further nickel metal disc: this disc represents the molding disc, or "stamper", which, similarly with respect to the "master" disc, bears on the surface at least one relief representing the negative of the original groove or groove engraved on the "mother" plate and on the lacquer.

According to a preferred aspect of the invention, a suitable molding disc suitable to be used in a process according to any of the embodiments described herein is a stamper disc made by means of the technology known in the sector with the term "Vinyl HD": this technology provides for the laser engraving of a ceramic plate in order to obtain a negative mold encoding the desired content or sound signal.

According to a further aspect of the invention, said molding disc is a "master" or "stamper" type disc made by use of a 3D printer, using any material known in the sector for this purpose.

As previously described, the pouring step according to the processes object of the present invention provides, for the production of a film or a phonograph disc, the use of an aqueous composition comprising a gelling agent of natural origin in replacement of the non-renewable raw material, such as PVC, commonly used in the sector. Advantageously, the authors of the present invention have found that the replacement of PVC with an aqueous composition such as those described and claimed in the present application entails a considerable gain in terms of sustainability and cost containment, while guaranteeing high sound quality standards and good mechanical strength.

The gelling agent of natural origin present in the aqueous composition used in the pouring step of the process according to the invention is preferably a gelling agent extracted from algae and/or aquatic biomass.

According to a preferred aspect, said gelling agent is a gelling agent of vegetable or animal origin.

In particular, said agent is a gelling agent of vegetable or animal origin and is selected from sodium alginate, xanthan or xanthan gum, agar-agar, gellan gum, carrageenan, in particular iota-carrageenan and/or kappa-carrageenan, methylcellulose, guar gum, chitosan, glue of animal origin, in particular isinglass, their derivatives and their mixtures.

Preferably said gelling agent is sodium alginate. Sodium alginate is a chemical compound formed from the sodium salt of alginic acid, with the minimum formula $NaC_6H_7O_6$, and can be extracted directly from the cell walls of algae.

In an alternative embodiment of the process according to the invention, the aqueous composition used in the pouring step can comprise a gelling agent of synthetic origin or a combination of a gelling agent of synthetic origin with a gelling agent of natural origin according to any of the variants described here.

According to one aspect of the invention, said aqueous composition contains a suitable amount of gelling agent, in particular sodium alginate, such as to make the resulting aqueous composition self-leveling.

Knowing the structure and properties of the selected gelling agent, a person skilled in the art will know how to dose the quantities of the aforementioned agent and of the aqueous solution in the composition such as to make the resulting aqueous composition self-leveling or having the desired consistency.

In a preferred embodiment of the process according to the invention, the aqueous composition used in the pouring step comprises an aqueous solution in an amount ranging from 96 to 98% by weight with respect to the total weight of the composition, preferably equal to 97.5%. by weight, and said gelling agent, in particular sodium alginate, in an amount ranging from 2 to 4% by weight with respect to the total weight of the composition, preferably equal to 2.5% by weight.

In one embodiment of any of the processes according to the invention, the aqueous composition used in the pouring step can be prepared by mixing about 200 grams (i.e. about 200 mL) of aqueous solution with about 4.5 or 5 grams of sodium alginate (or fractions or multiples of the respective amounts of water and sodium alginate maintaining the aforementioned relative proportions).

Preferably, the aqueous solution according to any of the embodiments described herein comprises or consists of water, such as for example running (tap) water or demineralized water or deionized water or distilled water or double-distilled water.

The aqueous composition used in the pouring step of a process according to any of the embodiments described herein can further also comprise one or more additives chosen from among: elasticizing agents, coloring agents, preservative agents, and odorant agents.

In a preferred embodiment according to the present invention, the composition comprises at least one coloring agent in order to impart the desired color to the resulting phonograph film or disc.

Examples of coloring agents which can be used for making a phonograph film or disc according to the invention include synthetic or natural dyes or pigments, preferably dyes obtainable starting from food scraps or dyes derived or extracted from fruit, seeds, leaves, flowers, or vegetables, depending on the desired color.

Non-limiting examples of natural dyes or pigments which can be employed for making a phonograph film or disc according to the invention include carotenoid-based dyes or pigments, e.g. gardenia yellow dyes, dunaliella-derived carotene, carrot-derived carotene, palm oil-derived carotene, tomato-derived dyes or paprika-derived dyes; quinone-based dyes or pigments, e.g. dyes derived from cochineal; dyes or pigments having an anthocyanin skeleton, e.g. dyes derived from red cabbage, *Perilla frutescens*, hibiscus, grape juice, grape skin, sweet potato, corn, elderberry or red berry; flavonoid-based dyes or pigments, e.g. dyes derived from cocoa, sandalwood, onion, tamarind, carob, licorice, sapphire wood dye, carthamus red dye or carthamus yellow dye; or porphyrin dyes, e.g. chlorophyllin, chlorophyll or spirulina dye.

Preferably, the coloring agents suitable for use in a method according to the present invention are non-toxic to humans and/or the environment.

In a preferred embodiment according to the present invention, the composition comprises at least one elasticizing agent, preferably of natural origin, in order to impart the desired elasticity to the resulting phonograph film or disc and obtain a groove of optimum quality.

Preferably, said elasticizing agent is glycerol or glycerin.

According to one aspect of the invention, an aqueous composition which can be used in a process according to the present invention can be prepared by mechanically mixing an aqueous solution with a gelling agent, in particular sodium alginate, according to any of the variants defined in the present description and in the claims. Merely by way of example, the mixing is carried out using a mechanical mixer.

Preferably, the aqueous solution and the gelling agent are subjected to mechanical mixing for a few minutes, preferably for about one minute, in order to amalgamate everything; subsequently the solution thus amalgamated is left to rest for a duration of between 6 and 12 hours in order to obtain a homogeneous aqueous composition, in particular free of lumps and/or air bubbles.

Depending on the gelling agent selected, in order to favor the formation of a homogeneous aqueous composition, the step of mixing the aqueous solution with the aforementioned gelling agent can be carried out in the presence of heat, for example at a suitable temperature to favor the solubilization of the selected gelling agent in the aqueous solution.

In one aspect, the step of mixing the aqueous solution with the gelling agent selected according to any of the variants described herein is carried out at a temperature between 30° C. and 60° C., in particular at a temperature between 30° C. and 50° C.

Knowing the structure and properties of the gelling agent selected, a person skilled in the art will be able to select the most suitable temperature to obtain solubilization of the agent in the aqueous solution. Merely by way of example, if the selected gelling agent is isinglass, the step of mixing the aqueous solution with the aforementioned gelling agent will preferably be carried out at a temperature between 30° C. and 40° C. In one aspect, the composition obtained by mixing according to any of the variants described herein, one or more additives exemplified in the present description and in the claims can be added and suitably mixed therewith in order to obtain a resulting homogeneous aqueous composition.

In the pouring step in any process according to the invention, a composition according to any of the embodiments described herein is cold poured or casted onto the surface of a suitable molding disc in an amount sufficient to form, respectively, a film or a layer that is able to homogeneously cover the aforementioned surface.

By way of example, for the production of a film or molding disc having a diameter equal to 12 inches (12"), i.e. 30.5 cm, the process according to the invention may provide for the pouring of a volume of aqueous composition comprised between 190 and 210 mL, preferably the pouring of a quantity of aqueous composition comprising or consisting of 200 grams of water and 4.5 to 5 grams of sodium alginate repeated several times, preferably twice.

For the production of a film or molding disc having a diameter of 10 inches (10"), i.e. about 25.4 cm, the process according to the invention may provide for the pouring of a volume of aqueous composition between about 165 and 170 mL, preferably the pouring of a quantity of aqueous composition comprising or consisting of 165 grams of water and 4.25 grams of sodium alginate.

For the production of a film or molding disc having a diameter of 7 inches (7"), i.e. about 17.7 cm, the process according to the invention may provide for the pouring of a volume of aqueous composition between about 115 and 122 mL, preferably the pouring of an amount of aqueous composition comprising or consisting of 117.36 grams of water and 2.64 grams of sodium alginate.

Once the dimensions of the molding disc used are known, the expert in the sector can easily determine the volume and/or the appropriate quantity of the aqueous composition according to the invention in order to obtain the pouring of a film or a layer which is able to cover homogeneously the surface of the aforementioned disk.

It is preferable that the preparation of the aqueous composition and/or the step of pouring it onto the surface of the molding disc are carried out at a temperature ranging from 15 to 22° C., even more preferably 16° C.

Preferably, in the pouring step of a process for producing a phonograph film or phonograph disc according to any of the embodiments described herein, the film or layer of composition being formed on the surface of the molding disc is allowed to solidify for a period of time between 24 and 72 hours. The duration of the solidification phase depends on the humidity and temperature, therefore, conditions of greater humidity can translate into a longer duration of the solidification phase.

According to the step of separation from the molding disc of a process for the preparation of a film or a phonograph disc according to any of the variants described herein, at the end of the solidification step, the film or layer formed, respectively, on the surface of the molding disc are separated from the molding disc in such a way as to preserve the groove formed on the printed face of the film or layer from the corresponding relief on the surface of the molding disc following solidification. It is preferable that the film or layer formed as a result of solidification be removed with suitable care and delicacy from the molding disc so as not to damage the grooves produced and the molding disc itself.

In this way, the phonograph film or disc resulting from the separation of the solidified film or layer from the molding disc will have at least one face comprising the furrow or groove formed by said at least one relief present on the surface of the molding disc; in particular, the groove will be distributed on the face of the resulting phonograph film or disc in a spiral direction, starting from the peripheral edge towards the center of said face of the film or record. As anticipated above, the recording of the desired content or sound signal will be encoded in an analogical way inside the groove on the face of the resulting phonograph film or disc.

The memorization or recording of the sound content or signal, encoded in the groove or channel of the phonograph film or disc obtainable by a process according to any of the embodiments described herein, can be reproduced mechanically according to any of the techniques known to a person skilled in the art.

Merely by way of example, for reproduction, said content or sound signal can be read by means of a pin, for example in diamond or other synthetic material, which is placed on the groove imprinted on the face of the phonograph film or disc, suitably connected to devices for translating, amplifying and reproducing the groove-encoded sound. The rotation of the phonograph film or disc causes the stylus to generate vibrations deriving from the irregularity of the groove which, by means of the stylus on which the stylus is mounted, can be carried to a transducer (i.e. a phono cartridge) mounted on a pickup arm. reading.

The phonograph disc of the invention can be used on any sound reproduction system including a commercially available record player (or turntable for a HiFi system).

According to one aspect of the present invention, the phonograph film obtainable by a method according to any of the embodiments described herein has a thickness of less than 80 μm, preferably between 25 and 80 μm, even more preferably between 40 and 80 μm or between 50 and 80 μm.

In an embodiment according to the invention, said phonograph film has a thickness equal to 25 μm, 30 μm, 35 μm, 40 μm, 45 μm, 50 μm, 55 μm, 60 μm, 65 μm, 70 μm, 75 μm, or 80 μm.

According to one aspect of the present invention, the phonograph disc obtainable by a method according to any of the embodiments described herein has a thickness greater than 80 μm, preferably equal to or greater than 100 μm, 500 μm, 1 mm, even more preferably a thickness between 1 mm and 4 mm, or between about 1.9 mm and 3.8 mm, or between about 1 mm and 1.5 mm.

According to a further aspect of the invention, the phonograph disc obtainable by a method according to any of the embodiments described herein has a weight or basis weight ranging from 3 to 10 grams, preferably equal to about 3.65 grams.

The subject of the present invention is therefore a phonograph film obtainable by means of a process according to any one of the embodiments described herein.

In order to increase the thickness of the resulting phonograph film and improve its mechanical resistance, so as to provide a phonograph "disc", a further object of the present invention is a process for the preparation of a phonograph disc for analog storage, recording and/or reproduction of a sound content including the following step:
    providing a phonograph film which can be prepared/obtained according to any of the embodiments described herein;
    cold pouring, on the flat face of said phonograph film, an aqueous composition according to any of the variants described herein and letting said aqueous composition solidify, so as to form a flat and homogeneous layer integral with said film.

According to one aspect of the present invention, the phonograph disc obtainable by the step according to the above embodiment has a thickness of between 1 mm and 4 mm, preferably between about 1.9 mm and 3.8 mm or between about 1 mm and 1.5 mm.

According to one aspect of the invention, said aqueous composition can comprise any additive known in the sector which allows it to increase its mechanical resistance.

The execution of the pouring step on film described here causes an increase in the thickness of the phonograph film, with a consequent increase in its rigidity and mechanical resistance which allow it to be easily transported, manipulated and/or reproduced. This makes it possible to avoid fixing the phonograph film thus obtained to a further support element.

According to one aspect of the invention, the pouring-on-film step can be repeated several times until the desired thickness of the phonograph disc is obtained.

In one embodiment, the aqueous mixture used can be the same used in the pouring steps described here for the preparation of the film itself or of the disc obtained with a single pouring on the negative, or an aqueous solution can be used comprising one or more additive agents which are able to increase their mechanical resistance properties.

The phonograph film obtainable by a process according to any of the embodiments described here can also be fixed to a support element having a discoidal shape (for example the shape conventionally used for a vinyl record having a diameter of 17.7 cm, 25 4 cm, 30.5 cm, or 40.6 cm, corresponding to a diameter of 7 inches or 7", 10 inches or 10", 12 inches or 12", and 16 inches or 16", respectively), in such a way as to obtain a resulting phonograph disc having the rigidity and/or mechanical resistance suitable for its transport, handling and/or reproduction.

The support will therefore have two faces, i.e. a first face (A) and a second face (B), like a common vinyl record, on which a phonograph film according to the present invention can be suitably fixed.

Therefore, a further aspect of the invention refers to a process for the preparation of a phonograph disc for analog storage, recording and/or reproduction of a sound content comprising the following steps:
    providing a phonograph film according to any of the embodiments described herein;
    providing a disc-shaped flat support element having a first face (A) and a second face (B); and
    fix the flat face of said phonographic film to said first face (A).

A support element suitable for use in a process according to the present invention can be made with any material known to an expert in the field. According to one aspect of the invention, the support element can be made with a material selected from cardboard, recycled cardboard, bioplastic of natural origin, or a material based on vegetable fibres.

The fixing of a support element to a phonograph film obtainable by means of any process of the invention can be carried out using any type of adhesive known in the sector, preferably by means of glue. Alternatively, it is possible that the fastening is carried out using a fastening technology known in the art, for example by the use of a vacuum pump.

It is important that the fixing operations are carried out in such a way that there are no differences in level between the film and the support layer, so as not to alter the sound quality or cause the stylus to skip.

Preferably the support element has a discoidal shape of the same dimensions as the phonograph film, with a suitable thickness, and has, like classic vinyl records, two faces, respectively indicated in the present description as (A) and (B) and will have the measurements conventionally used for vinyl records.

According to one aspect of the invention, the disc-shaped support element has a hole located in the center of its surface, preferably of a size suitable for allowing the correct positioning of the phonograph disc on any sound reproduction system, for example on the pin of a common commercially available turntable.

According to a further aspect of the invention, the support element can be subjected to a drilling process, before or after the passage of fixing the phonograph film on the face of the same, so as to form a central hole of dimensions suitable for allow the correct positioning of the resulting phonograph disc on any sound reproduction system.

The fixing of a support element to a phonograph film obtainable by any process of the invention can not only be used to facilitate the transport, handling or reproduction of the resulting disc, but can also be used as a label (or labels) containing content information or sound signal encoded on the disc.

In order to obtain a phonograph disc playable on both sides, according to one aspect of the present invention, a phonograph film obtainable by the process of the invention may be fixed on the free face of a phonograph disc obtainable by a method according to any of the forms previously described, where the expression "free face" refers to the face without grooves of the aforementioned phonograph disc.

Therefore, also an object of the present invention is a process for the preparation of a phonograph disc according to any of the embodiments described herein, further comprising the following steps:
providing a further phonograph film according to any of the embodiments described herein;
fixing the flat face of said further phonograph film onto a phonograph disc obtainable by means of a process according to any of the embodiments described herein, so as to obtain a phonograph disc carrying a groove encoding a sound content on each face.

According to one embodiment, this process can be carried out on a one-sided phonograph disc obtainable by single pouring on the (negative) molding disc, or obtainable by preparing the phonograph film of the invention and subsequent pourings until the production of a phonographic disc such as described above and in claim 14.

Alternatively, a phonograph film obtainable by the process of the invention can be fixed to a second, same or different phonograph film obtainable by the process of the invention, through the interposition and fixing between them of a support element according to any of the previously described variants.

For this purpose, therefore, the subject of the present invention is also a process for the preparation of a phonograph disc realized by means of the steps:
providing a phonograph film according to the invention;
providing a disc-shaped flat support element having a first face (A) and a second face (B); And
fix the flat face of said phonograph film to said first face (A)
further comprising the following steps:
providing a further phonograph film according to any of the embodiments described herein;
fix the flat face of said further phonographic film on the second face (B) of said support element.

According to a particular embodiment, the process for producing the two-sided disc according to the invention, the phonograph films fixed on the opposite sides of the disc will be the result of different preparation processes of the aforementioned films, in which molding discs will be used and thus encode different sound tracks, so as to result in a disc bearing grooves encoding different sound tracks on side A and side B.

The two phonograph films thus obtained can be connected to each other by interposing a suitable support element between them according to any one of the embodiments described herein.

The process according to any one of the embodiments described herein may possibly also include one or more trimming steps of the perimetric edge of the resulting phonograph film or disc.

The process of the invention may also include a step of applying a label, for example in the form of a paper circle, preferably in the center of one of the faces of the phonograph film or disc obtained, on which the main information will be reported relating to the content or sound signal encoded in the film or disc, or an indication relating to the side of the disc concerned.

The object of the present invention is also a phonograph disc obtainable by means of a process according to any one of the embodiments described herein.

With regard to the dimensions and other characteristics (thickness of the groove, speed of the phono engraving motor for preparing the grooves, number of revolutions, i.e. the number of times that the record rotates around the centering pin in the space of one minute) of the discs or films obtainable/obtained by means of the processes of the invention, these will preferably be those commonly used in the state of the art.

Examples of these characteristics are for example represented by the number of revolutions, the diameter, the recording duration, the recording quality.

With regard to the number of revolutions, the invention relates to phonograph discs/films at 78.26 rpm (commonly called simply 78 rpm), 45 rpm, 33⅓ rpm (commonly called 33 rpm) and 162/3 rpm, the latter normally used only for recording voice.

With regard to the diameter, commonly the 33 and 78 discs are available in three different sizes, i.e. with a diameter of 40.6 cm; 30.5 cm and 25.4 cm.

The common 45 rpm record, on the other hand, is normally produced with a diameter of 17.7 cm. The sector expert can also refer to the diameters expressed in inches commonly used in the recording industry.

The process object of the invention can also be used for the production of discs or films having diameters other than those exemplified in the present description, if, for example, molding dies or discs having the aforementioned diameters are produced and commercially available.

Discs/films having the above characteristics are the subject of this description.

The storage capacity of the discs and films of the invention in terms of recording duration and quality thereof is equivalent to that of commercially available vinyl discs.

Examples are given below which have the purpose of better illustrating the methodologies described in the present application, such examples are in no way to be considered as a limitation of the previous description and of the subsequent claims.

EXAMPLES

Example 1—Preparation of a Phonograph Disc in Bioplastic

Figure 2:
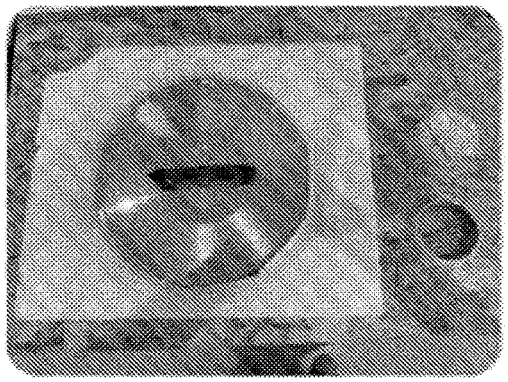
Figure 2B:
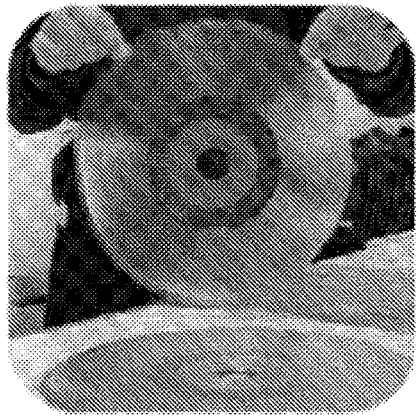
Figure 2C:
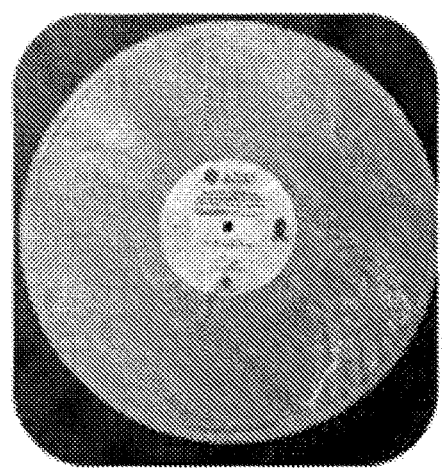
Figure 3:
FIG. 3 shows a phonograph disc being reproduced, obtained by a process according to the embodiment schematized in FIG. 1.

A phonograph disc in bioplastic material was made using the following procedure, schematized in FIG. 1:
A self-leveling aqueous composition was prepared comprising 97.5% by weight of water and 2.5% by weight of sodium alginate, based on the total weight of the composition, mixed mechanically and allowed to stand until it was homogeneous and has no lumps or air bubbles;

The aqueous composition thus prepared was cold poured onto the surface of a negative cast of the disc to be printed (i.e. molding disc or "stamper"), so as to form a flat and homogeneous film of the composition on the surface of the cast;

The film deposited on the "stamper" was left to solidify for 24-72 hours; for this purpose, the "stamper" was specially placed on a flat surface, so as not to have any type of slope;

Once solidified and dried, the film was removed from the surface of the "stamper" in order to obtain the resulting phonograph disc; the phonograph disc obtained is in the form of a circular plate, bearing on one side the characteristic grooves of the sound recording (FIG. 2);

in a variant of the procedure, before removing the disc from the "stamper", a further layer of the aqueous composition was poured and left to solidify on the face of the phonograph disc opposite to that bearing the grooves of the recording, so as to increase the thickness of the phonograph disc;

the phonograph disc was coupled to a layer of support material (i.e. recycled cardboard).

To verify the suitability of the phonograph disc produced according to the embodiment of the process of the invention described herein, a characterization of the surface of the disc was carried out by means of an optical microscope and sound reproduction tests were conducted. The sonic performance of the obtained phonograph disc was compared with that of a vinyl record prepared using traditional methods.

Figure 4:
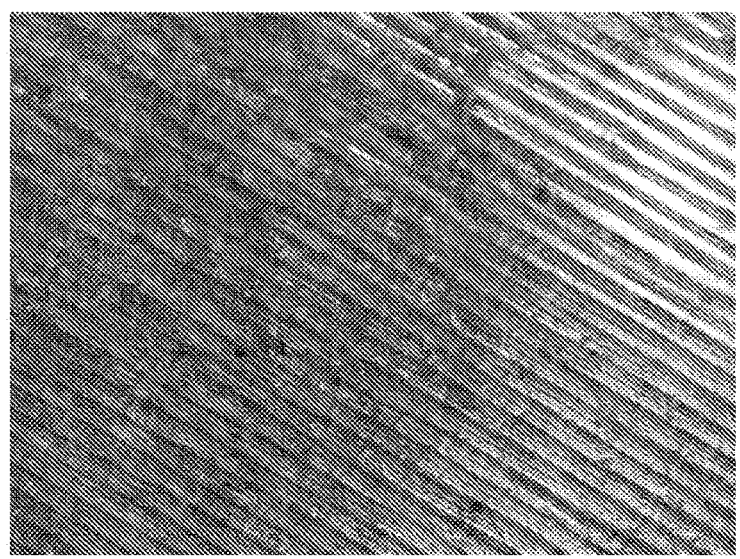
FIG. 4 shows an optical microscope enlargement of the grooves present on one face of a phonograph disc obtained by an embodiment of the process according to the invention.

The image shown in FIG. 4 shows the characteristic "grooves" of the sound recording which are imprinted on one face of the bioplastic phonograph disc prepared according to the method object of the present invention.

Figure 5:
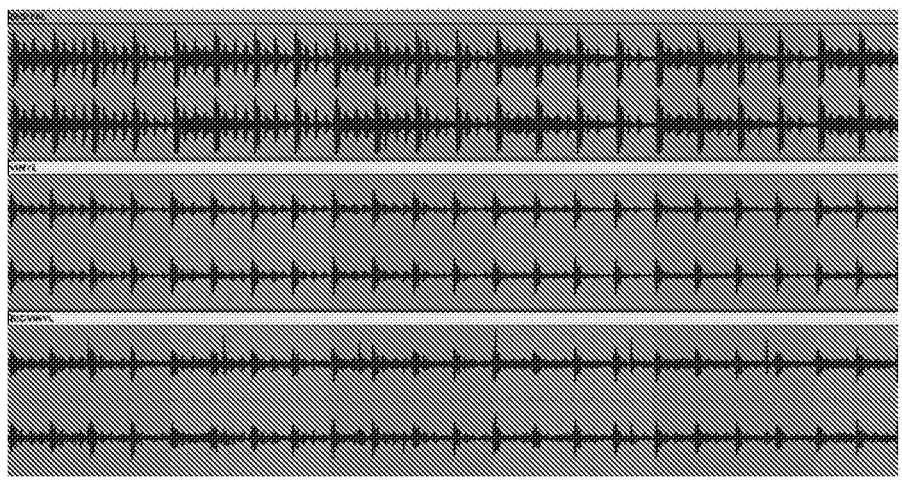
FIG. 5 shows a comparison between the same sound waveform digitally (top panel), engraved on a common vinyl record (middle panel), or printed on a phonograph disc obtained by means of a process according to the present invention (panel down).

From a comparison of the digital sound waveform, engraved on common vinyl, or printed on the bioplastic phonograph disc obtained (FIG. 5), it can be seen how the process object of the present invention allows to obtain phonograph discs having completely comparable sound performances compared to those of discs obtainable by traditional methods.

Analogous results can be obtained by using, instead of the sodium alginate, a gelling agent of natural origin chosen from those exemplified in the present description.

The invention claimed is:

1. A process for the production of a phonograph film or disc for analog storage, recording and/or reproduction of a sound content, comprising at least the following steps:

cold pouring, on the surface of a molding disc bearing at least one relief configured to negatively encode said sound content distributed in a spiral-like direction, starting from the perimeter edge towards the center of said surface, of an aqueous composition comprising a gelling agent of natural origin, so as to form a homogeneous film or layer of said aqueous composition on said surface of the molding disc having a flat face and a printed opposite face, and allowing said film or layer to solidify;

said relief being configured to form, following said solidification, a corresponding groove encoding said sound content on the printed face of said film or layer in contact with said surface of the molding disc;

separating said film or layer from the molding disc in such a way as to obtain said phonograph film or disc.

2. The process according to claim 1, further comprising the following step, preceding the step of separating said film:

carrying out one or more times, on the flat face of the film formed on the surface of the molding disc, said cold pouring of the aqueous composition until obtaining, following solidification, a thickness of said film between 40 μm and 80 μm or between 50 μm and 80 μm.

3. The process according to claim 1, wherein said phonograph film has a thickness comprised between 40 μm and 80 μm or between 50 μm and 80 μm.

4. The process according to claim 1, further comprising the following step, preceding the step of separating said layer:

carrying out one or more times, on the flat face of the layer formed on the surface of the molding disc, said cold pouring of the aqueous composition until obtaining, following solidification, a thickness of said layer greater than 80 μm.

5. The process according to claim 1, wherein said phonograph disc has a thickness greater than 80 μm.

6. The process according to claim 5, wherein said phonograph disc has a thickness comprised between 1 mm and 4 mm, or between 1.9 mm and 3.8 mm, or between about 1 mm and 1.5 mm.

7. The process according to claim 1, wherein said gelling agent of natural origin is selected from sodium alginate, xanthan or xanthan gum, agar-agar, gellan gum, carrageenan, iota-carrageenan and/or kappa-carrageenan, methylcellulose, guar gum, chitosan, glue of animal origin, isinglass, agar-agar and mixtures thereof.

8. The process according to claim 1, wherein said gelling agent of natural origin is sodium alginate.

9. The process according to claim 1, wherein said aqueous composition comprises an aqueous solution in an amount comprised between 96 and 98% by weight with respect to the total weight of the aqueous composition, preferably equal to 97.5% by weight, and sodium alginate an amount comprised between 2 and 4% by weight with respect to the total weight of the aqueous composition, preferably equal to 2.5% by weight.

10. The process according to claim 1, wherein said aqueous composition further comprises one or more additives selected from: elasticizing agents, coloring agents, preservative agents, and odorant agents.

11. The process according to claim 1, wherein said aqueous composition further comprises glycerol.

12. The process according to claim 1, wherein, in said pouring step said film or layer is left to solidify for a period of time of at least 24 hours.

13. A phonograph film obtainable by a process according to claim 1.

14. The process according to claim 1, comprising:
providing said phonograph film;
cold pouring, on the flat face of said phonograph film, a second aqueous composition comprising a second gelling agent of natural origin and allowing said second aqueous composition to solidify so as to form a flat and homogeneous layer integral with said film and thereby obtain said phonograph disc, wherein said second gelling agent of natural origin is selected from sodium alginate, xanthan or xanthan gum, agar-agar, gellan gum, carrageenan, iota-carrageenan and/or kappa-carrageenan, methylcellulose, guar gum, chitosan, glue of animal origin, isinglass, agar-agar and mixtures thereof.

15. The process according to claim 1, comprising:
providing said phonograph film;
providing a flat support element having a discoidal shape having a first face (A) and a second face (B); and fixing the flat face of said phonograph film to said first face (A) to thereby obtain said phonograph disc.

16. The process according to claim 15, wherein said support element is made with a material selected from cardboard, recycled cardboard, bioplastic of natural origin, or a material based on vegetable fibers.

17. The process according to claim 1, further comprising the following steps:
   providing said phonograph disc;
   providing a further phonograph film comprising a flat face according to the cold pouring and separating steps;
   fixing the flat face of said further phonograph film on said phonograph disc, so as to obtain a phonograph disc carrying a groove encoding a sound content on each face.

18. The process according to claim 15, further comprising the following steps:
   providing a further phonograph film according to the cold pouring and separating steps;
   fixing the flat face of said further phonograph film on the second face (B) of said support element of the phonograph disc.

19. A phonograph disc obtainable by a process according to claim 1.

* * * * *

UNITED STATES PATENT AND TRADEMARK OFFICE
CERTIFICATE OF CORRECTION

| | | |
|---|---|---|
| PATENT NO. | : 12,334,107 B1 | Page 1 of 1 |
| APPLICATION NO. | : 18/842934 | |
| DATED | : June 17, 2025 | |
| INVENTOR(S) | : Sabrina Lucibello and Giovanni Inglese | |

It is certified that error appears in the above-identified patent and that said Letters Patent is hereby corrected as shown below:

On the Title Page

The Applicant information at Item (71) which currently reads:
"Università degli Studi di Roma "La Sapienza" "LA SAPIENZA", Rome (IT)"

Is hereby corrected to read:
--Università degli Studi di Roma "La Sapienza", Rome (IT)--

Signed and Sealed this
Twelfth Day of August, 2025

Coke Morgan Stewart
*Acting Director of the United States Patent and Trademark Office*